US005773541A

United States Patent [19]
Boeckh et al.

[11] Patent Number: 5,773,541
[45] Date of Patent: Jun. 30, 1998

[54] PREPARATION OF COPOLYMERS OF VINYL ESTERS AND MONOETHYLENICALLY UNSATURATED CARBOXYLIC ACIDS AND THEIR USE

[75] Inventors: Dieter Boeckh, Limburgerhof; Axel Kistenmacher, Ludwigshafen; Walter Denzinger, Speyer; Iris Rau, Frankenthal; Angelika Funhoff, Schriesheim; Richard Baur, Mutterstadt; Alexander Kud, Eppelsheim; Volker Schwendemann, Nuestadt, all of Germany

[73] Assignee: BASF Aktiengesellschaft, Ludwigshafen, Germany

[21] Appl. No.: 693,220

[22] PCT Filed: Feb. 17, 1995

[86] PCT No.: PCT/EP95/00575

§ 371 Date: Aug. 21, 1996

§ 102(e) Date: Aug. 21, 1996

[87] PCT Pub. No.: WO95/22569

PCT Pub. Date: Aug. 24, 1995

[30] Foreign Application Priority Data

Feb. 22, 1994 [DE] Germany .......................... 44 05 621.4

[51] Int. Cl.$^6$ ..................................................... C08F 2/00
[52] U.S. Cl. ...................... 526/209; 526/229; 526/318.4
[58] Field of Search ............................... 526/318.4, 229, 526/209

[56] References Cited

U.S. PATENT DOCUMENTS 3,245,936  4/1966  Corey et al. ...................... 526/318.4
3,268,491  8/1966  Hattori et al. .
3,268,496  8/1966  Germain .............................. 526/318.4
3,477,980  11/1969  Daniels .................................. 526/229
3,498,938  3/1970  Grommers et al. ................. 526/318.4
3,530,080  9/1970  Kirkwood .......................... 526/318.4
3,887,480  6/1975  Rue et al. .
3,925,327  12/1975  Mitsushima et al. ................. 526/229

FOREIGN PATENT DOCUMENTS 0 441 022  5/1995  European Pat. Off. .
0222885  5/1985  Germany ............................ 526/318.4

*Primary Examiner*—Joseph L. Schofer
*Assistant Examiner*—N. Sarofim
*Attorney, Agent, or Firm*—Oblon, Spivak, McClelland, Maier & Neustadt, P.C.

[57] ABSTRACT

A process for preparing copolymers of vinyl esters and monoethylenically unsaturated carboxylic acids by free-radical copolymerization of (a) 20 to 80 mol % of vinyl esters of aliphatic monocarboxylic acids having at least 2 carbon atoms and (b) 80–20 mol % of monoethylenically unsaturated carboxylic acids, with or without (c) 0–30 mol % of other copolymerizable monoethylenically unsaturated monomers and/or (d) 0–10 mol % of monomers which contain at least two non-conjugated ethylenic double bonds in the molecule, in the presence of at least one sulfur, phosphorus and/or nitrogen compound with a reducing action and of 0.05–30% by weight, based on the monomers, of at least one surface-active agent in aqueous medium in the presence of initiators and in the presence or absence of regulators, and the use of the copolymers or of the copolymers which are obtainable therefrom by hydrolysis and/or oxidation and have vinyl alcohol units as additive to detergents and cleaners.

7 Claims, No Drawings

PREPARATION OF COPOLYMERS OF VINYL ESTERS AND MONOETHYLENICALLY UNSATURATED CARBOXYLIC ACIDS AND THEIR USE

The present invention relates to the preparation of copolymers of vinyl esters and monoethylenically unsaturated carboxylic acids by free-radical copolymerization in aqueous medium in the presence of initiators and in the presence or absence of regulators and to the use of the copolymers as additive to detergents and cleaners.

U.S. Pat. No. 3,268,491 discloses a process for preparing copolymers of vinyl acetate and monoethylenically unsaturated dicarboxylic acids by copolymerization of the monomers in aqueous medium at pH 3–6 in the presence of redox catalysts. Persulfates are preferably used as oxidizing component of the redox system, while sulfites or thiosulfates are used as reducing component. The oxidizing component is in this case always used in a molar excess over the reducing component. Alternating copolymers are obtained.

EP-A-0 441 022 discloses copolymers of monoethylenically unsaturated dicarboxylic acids and monoethylenically unsaturated monocarboxylic acids prepared by copolymerization of 3–25% by weight of at least one monoethylenically unsaturated dicarboxylic acid and 75–97% by weight of at least one monoethylenically unsaturated monocarboxylic acid, with or without ethylenically unsaturated monomers without carboxyl groups, in the presence of water-soluble polymerization initiators, copper salts as polymerization moderators and a base. Vinyl acetate is also mentioned as ethylenically unsaturated monomer without carboxyl groups but is not proven by examples. Under the polymerization conditions described, however, there is observed to be great decomposition of the vinyl acetate and the formation of vinyl acetate homopolymers.

U.S. Pat. No. 3,887,480 describes the preparation of terpolymers from 35–70 mol % of maleic acid, 20–45 mol % of vinyl acetate and 2–40 mol % of acrylic acid in aqueous medium in the presence of 18–40% by weight of persulfate and of bisulfite, with persulfate being used in a molar excess over bisulfite.

GB-A-923 850 discloses the preparation of latices having a polymer content of 30–55% by weight by polymerizing vinyl acetate with 0.5–3.0% by weight, based on the monomer mixture, in the presence of redox catalysts and wetting agents in aqueous emulsion at below 50° C.

In the processes described above, the ethylenically unsaturated carboxylic acids are at least partially neutralized because otherwise excessive decomposition of the vinyl acetate would occur during the polymerization.

It is an object of the present invention to provide a process for preparing copolymers of vinyl esters of saturated carboxylic acids having at least 2 carbon atoms, in which the decomposition of the vinyl esters during the polymerization is not as serious as in known processes.

We have found that this object is achieved by a process for preparing copolymers of vinyl esters and monoethylenically unsaturated carboxylic acids by free-radical copolymerization in aqueous medium in the presence of initiators and in the presence or absence of regulators, which comprises copolymerizing (a) 20 to 80 mol % of vinyl esters of aliphatic monocarboxylic acids having at least 2 carbon atoms and (b) 80–20 mol % of monoethylenically unsaturated carboxylic acids, with or without (c) 0–30 mol % of other copolymerizable monoethylenically unsaturated monomers and/or (d) 0–10 mol % of monomers which contain at least two non-conjugated ethylenic double bonds in the molecule, in the presence of at least one sulfur, phosphorus and/or nitrogen compound with a reducing action and of 0.05–30% by weight, based on the monomers, of at least one surface-active agent.

Compared with known processes for preparing copolymers of vinyl esters, the advantages of the process according to the invention are that the decomposition of the vinyl esters during the copolymerization is very greatly diminished, that the resulting copolymers are kept in dispersion or in solution, and that the vinyl esters are incorporated in the resulting copolymer in the same proportion as in the monomer mixture.

Suitable vinyl esters are derived from saturated carboxylic acids having at least two carbon atoms, e.g. vinyl acetate, vinyl propionate, vinyl butyrate, vinyl isobutyrate, vinyl palmitate, vinyl stearate and vinyl laurate. Thus the vinyl esters can be based, for example, on saturated carboxylic acids having 2–18 carbon atoms. It is possible to use in the copolymerization one or a mixture of at least two different vinyl esters, e.g. mixtures of vinyl acetate and vinyl propionate or mixtures of vinyl acetate and vinyl butyrate. Vinyl esters which are preferably used in the copolymerization are vinyl acetate and vinyl propionate. The vinyl esters are present in the monomer mixtures used for the copolymerization in amounts of 20–80, preferably 25–65 mol %.

The copolymers contain as copolymerized component (b) monoethylenically unsaturated carboxylic acids. Monomers (b) are derived, for example, from monoethylenically unsaturated carboxylic acids having 3–8, preferably 3–5, carbon atoms. Examples of suitable monomers of component (b) are acrylic acid, methacrylic acid, vinyl acetic acid, crotonic acid, maleic acid, fumaric acid, itaconic acid and citraconic acid. Preferably used from this group of monomers in the copolymerization is acrylic acid or mixtures of acrylic acid and maleic acid. Such mixtures preferably contain 20–60 mol % of acrylic acid and 10–55 mol % of maleic acid. The monomers of group (b) can be present in amounts of 20–80, preferably 25–75, mol % in the monomer mixture. The dicarboxylic acids can also be used in the copolymerization as anhydrides, if they are formed, or as monoesters with $C_1$–$C_4$-alcohols.

The monomer mixtures may contain (c) other copolymerizable monoethylenically unsaturated monomers, e.g. acrylamide, methacrylamide, 2-acrylamido-2-methylpropanesulfonic acid, vinylsulfonic acid, allylsulfonic acid, methallylsulfonic acid, vinylphosphonic acid, allylphosphonic acid, acrylonitrile, methacrylonitrile, dimethylaminoethyl acrylate, diethylaminoethyl acrylate, diethylaminoethyl methacrylate, N-vinylpyrrolidone, N-vinylformamide, N-vinylimidazole, N-vinylimidazoline, 1-vinyl-2-methylimidazole, 1-vinyl-2-methylimidazoline and hydroxyalkyl esters, having 2–6 carbon atoms in the hydroxyalkyl group, of monoethylenically unsaturated carboxylic acids containing 3–6 carbon atoms, such as hydroxyethyl acrylate, hydroxyethyl methacrylate, hydroxy-n-propyl acrylate, hydroxyisopropyl acrylate, hydroxyisobutyl acrylate, mono(hydroxyethyl) maleate, 1,4-butanediol monoacrylate and di(hydroxy-n-butyl) maleate. The monomers of group (c) are used in amounts of 0–30 mol % in the copolymerization. If these monomers are used to modify the copolymers, they are preferably used in amounts of 5–20 mol %.

The copolymerization may take place in the additional presence of monomers of group (d). These monomers are able to copolymerize with the other monomers and contain at least two ethylenic double bonds in the molecule. Compounds of this type are normally called polymerization crosslinkers. Examples of suitable crosslinkers are diacrylates or dimethacrylates of saturated alcohols which are at least dihydric, e.g. ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentyl glycol diacrylate, neopentyl glycol dimethacrylate, 3-methylpentanediol diacrylate and 3-methylpentanediol dimethacrylate. The acrylic and methacrylic esters of alcohols with more than 2 OH groups can also be used as crosslinkers, e.g. trimethylolpropane triacrylate or trimethylolpropane trimethacrylate. Another class of crosslinkers comprises diacrylates or dimethacrylates of polyethylene glycols or polypropylene glycols with molecular weights of, in each case, 200–9000. Polyethylene glycols or polypropylene glycols used to prepare the diacrylates or dimethacrylates preferably have a molecular weight of, in each case, 400–2000. Apart from the homopolymers of ethylene oxide or propylene oxide it is also possible to use block copolymers of ethylene oxide and propylene oxide or copolymers of ethylene oxide and propylene oxide which contain the ethylene oxide and propylene oxide units in random distribution. The oligomers of ethylene oxide and propylene oxide are also suitable for preparing the crosslinkers, e.g. diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Also suitable as crosslinkers are vinyl esters of ethylenically unsaturated $C_3$–$C_6$-carboxylic acids, e.g. vinyl acrylate, vinyl methacrylate or vinyl itaconate. Also suitable as crosslinkers are vinyl esters of saturated carboxylic acids containing at least 2 carboxyl groups, as well as di- and polyvinyl ethers of alcohols which are at least dihydric, e.g. divinyl adipate, butanediol divinyl ether and trimethylolpropane trivinyl ether. Other crosslinkers are allyl esters of ethylenically unsaturated carboxylic acids, e.g. allyl acrylate and allyl methacrylate, allyl ethers of polyhydric alcohols, e.g. pentaerythritol triallyl ether, triallylsucrose and pentaallylsucrose. Also suitable as crosslinkers are methylenebismethacrylamide, divinylethyleneurea, divinylpropyleneurea, divinylbenzene, divinyldioxane, tetraallylsilane and tetravinylsilane.

The monomers of group (d) may be used in the copolymerization. They may be present in amounts of up to 10 mol % in the monomer mixtures. If monomers of group (d) are copolymerized with monomers of groups (a) and (b), without or without group (c), the amounts which are preferably used are 0.05–8 mol % based on the monomer mixtures.

Suitable initiators are compounds which are customary for this purpose and form free radicals under the polymerization conditions, e.g. peroxides, hydroperoxides, peroxodisulfates, percarbonates, peroxyesters, hydrogen peroxide and azo compounds.

Examples of initiators which may be soluble or insoluble in water are hydrogen peroxide, dibenzoyl peroxide, dicyclohexyl peroxodicarbonate, dilauroyl peroxide, methyl ethyl ketone peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfates, azodiisobutyronitrile, 2,2'-azobis(2-amidinopropane) dihydrochloride, 2,2'-azobis(N,N'-dimethyleneisobutyramidine) dihydrochloride, 2-(carbamoylazo)iso-butyronitrile and 4,4'-azobis(4-cyanovaleric acid).

The abovementioned initiators can be used alone or mixed with one another, e.g. mixtures of hydrogen peroxide and sodium peroxodisulfate. Water-soluble initiators are preferably used. Also suitable are the known redox catalysts in which the reducing component is used in a molar excess. For example, the abovementioned peroxide initiators can be used together with another reducing agent in addition to the reducing sulfur or phosphorus compounds to be added in the process according to the invention. Examples of suitable other reducing agents are ascorbic acid, formic acid and aldehydes.

The redox catalysts may additionally contain salts of transition metals, e.g. salts of iron, cobalt, nickel, copper, vanadium and manganese. Examples of suitable salts are iron(II) sulfate, cobalt(II) chloride, nickel(II) sulfate, copper (I) chloride, manganese(II) acetate, vanadium(III) acetate and manganese(II) chloride.

The known redox catalysts may contain the reducing component in a ratio of 0.05–1 mol per mol of the oxidizing component. The heavy metal ions are normally used in amounts of from 0.1 ppm to 0.2%.

The initiators are generally used in amounts of 0.05–30, preferably 1–15, % of the weight of the monomers to be polymerized.

In order to control the molecular weight of the copolymers it is possible to carry out the copolymerization in the presence of regulators. Examples of suitable regulators are aldehydes such as formaldehyde, acetaldehyde, propionaldehyde, n-butyraldehyde and isobutyraldehyde, formic acid, ammonium formate, hydroxylammonium salts such as hydroxylammonium sulfate and hydroxylammonium phosphate. Examples of regulators which contain sulfur in bound form, such as compounds having SH groups, are thioglycolic acid, mercaptopropionic acid, mercaptoethanol, mercaptopropanol, mercaptobutanols and mercaptohexanol. Examples of further regulators are monohydric and polyhydric alcohols having up to 6 carbon atoms such as isopropanol, n-butanol, butenols, isobutanol, glycol, glycerol and pentaerythritol, as well as salts of hydrazine, e.g. hydrazinium sulfate, are also suitable. The amounts of regulators used in the copolymerization are 0.2–25, preferably 0.5–10, % of the weight of the monomers. The particularly effective regulators, such as compounds containing SH groups, are normally used in amounts not exceeding 15% by weight.

The copolymers are prepared according to the invention in the presence of a sulfur or phosphorus compound with a reducing action. Examples of sulfur compounds with a reducing action are sulfites, bisulfites, thiosulfates, dithionites and tetrathionates of alkali metals and ammonium compounds, e.g. sodium sulfite, potassium sulfite, ammonium sulfite, sodium bisulfite, ammonium bisulfite, potassium bisulfite, sodium thiosulfate, potassium thiosulfate, ammonium thiosulfate, sodium dithionite, potassium dithionite and sodium tetrathionate. Sulfur dioxide can also be used as sulfur compound with a reducing action.

Suitable phosphorus compounds with a reducing action are all phosphorus compounds in which phosphorus has an oxidation number from 1 to 4, for example sodium hypophosphite, phosphorous acid and phosphites such as sodium phosphite, potassium phosphite and ammonium phosphite. Examples of nitrogen compounds with a reducing action are aliphatic or aromatic amines, hydrazine or hydroxylamine. The nitrogen compounds with a reducing action can be employed in the form of the free bases or in salt form. The amines preferably have a boiling point above 80° C. Examples of suitable amines are triethylamine, phenylethylamine, dibutylamine, oleylamine and dimethylaniline. Particularly effective examples are hydrazine sulfate and hydroxylammonium chloride. It may in some cases be advantageous to employ mixtures of compounds with a reducing action, for example mixtures of at least one sulfur compound with a reducing action and at least one nitrogen compound with a reducing action or mixtures of at least one phosphorus compound with a reducing action and at least one nitrogen compound with a reducing action.

Reducing agents which are preferably used are sodium sulfite, sodium bisulfite, sodium dithionite, sulfur dioxide, phosphorous acid and sodium phosphite. The potassium or ammonium salts can also be used in place of the sodium salts. It is, of course, also possible to use mixtures of two different reducing agents in the copolymerization.

The amount of reducing sulfur, nitrogen and/or phosphorus compound is, for example, 0.06–30, preferably 2–25, % of the weight of the monomers used.

Suitable surface-active agents are all compounds which reduce the surface tension of water. Such compounds are normally used as emulsifier in the emulsion polymerization. Examples of suitable surface-active agents are alkoxylated alcohols, alkoxylated phenols, alkoxylated amines, alkoxylated carboxylic acids, alkyl polyglycosides, alkyl sulfates, alkylsulfonates, alkylbenzenesulfonates and/or block copolymers of ethylene oxide and propylene oxide.

Particularly suitable alkoxylated alcohols are prepared, for example, by ethoxylation of alcohols having 8–22 carbon atoms, it being possible to use both natural and synthetic alcohols. The alcohols can be straight-chain or branched and may also have hyroxyl groups or else contain one or more ethylenic double bonds. The alcohols may be reacted with 2–50, preferably 3–25, mol of ethylene oxide per mol of alcohol. It is likewise possible to use block copolymers obtainable by stepwise alkoxylation of alcohols with, for example, ethylene oxide and then propylene oxide, and possibly butylene oxide. The arrangement of the alkylene oxide blocks can moreover be arbitrary. The addition of alkylene oxides onto alcohols can also be carried out with a mixture of alkylene oxides to result in alkoxylated alcohols with a random structure.

The other alkoxylated compounds are obtained by preparation on the same principle, by addition of at least one alkylene oxide onto alkylphenols, amines or carboxylic acids. The alkylphenols normally contain 1–12 carbon atoms in the alkyl group. The amines may, for example, contain one or more amino groups in the molecule and have 8–22 carbon atoms.

Carboxylic acids used for the alkoxylation preferably have 8–22 carbon atoms in the molecule.

Alkyl sulfates and alkylsulfonates are, like the other surface-active agents mentioned, commercially available. The alkyl group contains in most cases 12–16 carbon atoms. The alkyl group in the alkylbenzenesulfonates is derived, for example, from straight-chain or branched alkyl radicals having 8–16 carbon atoms. Suitable block copolymers of ethylene oxide and propylene oxide may have, for example, molecular weights (number average) of 300–10,000.

The surface-active agents can be used in the copolymerization either alone or mixed with another. They are used, for example, in amounts of 0.05–30, preferably 0.5–15, % of the weight of the monomers. In most cases, the amounts are 0.75–10% of the weight of the monomers.

The copolymerization of monomers (a) and (b), with or without (c) and/or (d) takes place in an aqueous medium. It can be carried out continuously or batchwise by conventional polymerization techniques. The polymerization is normally carried out under an inert gas atmosphere, e.g. under nitrogen. The amount of water is chosen so that, for example, the resulting polymer solutions have a concentration of 10–80, preferably 30–70, % by weight.

The degree of neutralization of the monomers containing acidic groups is, for example, 0–30, preferably 0–15%. The copolymerization is preferably carried out at pH<3 because this results in clear, homogeneous copolymer solutions. On the other hand, polymerization with degrees of neutralization>30% results in cloudy polymer solutions from which the copolymer may partially precipitate.

Copolymerization by the process according to the invention is preferably carried out with mixtures of (a) 25–75 mol % of vinyl acetate and/or vinyl propionate and (b) 75–25 mol % of acrylic acid and/or methacrylic acid or of (a) 25–75 mol % of vinyl acetate and/or vinyl propionate, (b1) 20–60 mol % of acrylic acid and/or methacrylic acid and (b2) 5–55 mol % of maleic acid monomers. The copolymerization is preferably carried out with an alkali metal or ammonium peroxodisulfate in the presence of a sulfur compound with a reducing action. In this case, the molar ratio of peroxodisulfate to sulfur compound with a reducing action is preferably from 1:1.1 to 1:20. In most cases it is 1:1.5 to 10. The copolymerization can be carried out under atmospheric pressure or reduced or elevated pressure within a wide temperature range. The temperatures can be, for example, from 10° to 170° C., and elevated pressure is used for temperatures above the boiling point of the reaction mixture. The copolymerization is normally carried out at from 30° to 100°, preferably 40° to 80° C. Homogeneous aqueous solutions or dispersions of copolymers are obtained. At high concentration, the copolymers may precipitate out of the solutions. However, they can be redissolved, or at least converted into a stable and homogeneous dispersion, by neutralization with alkali metal bases or ammonia. The copolymers have K values of, for example, 8–120, usually 10–70 (determined by the method of H. Fikentscher on a 1% by weight aqueous solution of the Na salt of the copolymers at pH 7 and 25° C.).

Copolymers containing vinyl esters as copolymerized units can, if required, be modified by solvolysis and/or oxidation. The copolymers can be hydrolyzed, for example, by adding sodium hydroxide or potassium hydroxide solution to the solutions obtained from the copolymerization to adjust to a pH above 8 and, if necessary, increasing the rate of hydrolysis of the copolymerized vinyl ester moieties to vinyl alcohol units by increasing the temperature of the solution to, for example, 100° C. The hydrolysis can be carried out incompletely, e.g. 5–90%, or completely. The K value of the hydrolyzed copolymers is likewise in the range from 10 to 120.

The copolymers can, if required, also be oxidized, when in most cases a decrease in molecular weight is observed. Accordingly, the K value of the oxidized copolymers also changes. It is, for example, 2–50 units below the K value of the copolymers obtainable in the copolymerization. The copolymers are preferably oxidized in aqueous solution. Suitable oxidizing agents are all compounds which donate active oxygen, for exmaple alkaline hypochlorite solutions, ozone or hydrogen peroxide. The oxidation can take place, for example, at from 10° to 100° C. Since the oxidation is preferably carried out in an alkaline medium, it is accompanied by more or less pronounced hydrolysis of the copolymers. The oxidative treatment improves the dispersing properties of the copolymers.

The copolymers obtainable by the process according to the invention, and the copolymers obtainable therefrom by hydrolysis and/or oxidation, are used as additive to detergents and cleaners. In reduced phosphate (phosphate contents<25% by weight) and phosphate-free formulations they have a pronounced encrustation-inhibiting effect, and they may be present therein in amounts of 0.1–30, preferably 1–15, % of the weight of the particular formulations.

The detergents and cleaners contain at least one surfactant and, where appropriate, other conventional ingredients. Preferred surfactants are biodegradable.

The detergents can be in powder form or else in a liquid formulation. The composition of the detergent and cleaner formulations may vary widely. Detergent and cleaner formulations normally contain 2–50% by weight of surfactants and, where appropriate, builders. These figures apply both to liquid and to powdered detergents. Detergent and cleaner formulations conventional in Europe, the USA and Japan are tabulated, for example, in Chemical and Engineering News, 67, (1989) 35. Further details of the composition of detergents and cleaners are to be found in WO-A-90/13581 and Ullmanns Encyklopädie der technischen Chemie, Verlag Chemie, Weinheim 1983, 4th edition, pages 63–160. The detergents may also contain a bleach, e.g. sodium perborate, which may be present when used in the detergent formulation in amounts of up to 30% by weight. The detergents and cleaners may contain other conventional additives, e.g. complexing agents, opacifiers, optical brighteners, enzymes, perfume oils, color-transfer inhibitors, antiredeposition agents, soil-release polymers and/or bleach activators.

The K values of the copolymers were determined by the method of H. Fikentscher, Cellulose-Chemie, 13 (1932) 58–64 and 71–74 on aqueous solutions of the sodium salts of the copolymers at a concentration of 1% by weight and at pH 7 and at 25° C.

In the examples, percentages are by weight.

EXAMPLE 1

49.1 g of maleic anhydride together with 21.5 g of a 20% strength aqueous solution of an adduct of 25 mol of ethylene oxide and 1 mol of isooctylphenol and 12.3 g of a 35% strength aqueous solution of a sulfate of an adduct of 25 mol of ethylene oxide and 1 mol of isooctylphenol in 190 ml of water were introduced into a 2 l glass reactor equipped with an anchor agitator and 4 addition vessels and were heated under an inert gas to an internal temperature of 65° C. A mixture of 215 g of vinyl acetate and 144.2 g of acrylic acid was metered into this solution over the course of 5 h. Starting at the same time, a solution of 20.4 g of sodium peroxodisulfate in 184 ml of water and 10.2 g of sodium bisulfite in 263 g of water was metered in over the course of 6 h. The internal temperature of the reaction mixture was kept at 65° C. during this. After the additions were complete, the mixture was heated at 65° C. for a further 2 h. The solution was cooled to room temperature and, while cooling, adjusted to pH 7 with sodium hydroxide solution. The polymer had a K value of 65.9. The solution contained 2.9% sodium acetate.

EXAMPLE 2

500 g of the solution of the copolymer from Example 1 were refluxed with 84.5 g of 50% strength aqueous sodium hydroxide solution for 2 h. The pH was adjusted back to 7 with sulfuric acid, and the mixture was diluted with 700 ml of water. The product had a K value of 45.7.

EXAMPLE 3

Example 1 was repeated with 30.6 g of sodium bisulfite. The resulting copolymer had a K value of 38.2. The aqueous solution contained 3.5% sodium acetate.

EXAMPLE 4

500 g of the solution of the polymer from Example 3 were refluxed with 85.3 g of 50% strength aqueous sodium hydroxide solution for 2 h. The pH was then adjusted to 7 by adding sulfuric acid, and the mixture was diluted with 700 ml of water. The hydrolyzed copolymer had a K value of 28.2.

EXAMPLE 5

Example 1 was repeated except that 10.2 g of sodium peroxodisulfate were used as initiator. The resulting copolymer had a K value of 68.6. The aqueous copolymer solution contained 3.5% sodium acetate.

EXAMPLE 6

Example 1 was repeated except that 81.6 g of sodium bisulfite were used. The resulting copolymer had a K value of 16.1. The aqueous copolymer solution contained 2.5% sodium acetate.

EXAMPLE 7

500 g of the solution of the copolymer from Example 6 were refluxed with 77.5 g of 50% strength aqueous NaOH for 2 h. The mixture was then adjusted to pH 7 by adding sulfuric acid and diluted with 700 ml of water. The product had a K value of 14.8.

EXAMPLE 8

98.7 g of maleic anhydride together with 21.5 g of a 20% strength solution of an adduct of 25 mol of ethylene oxide and 1 mol of isooctylphenol and 12.3 g of a 35% strength solution of a sulfate of an adduct of 25 mol of ethylene oxide and 1 mol of isooctylphenol in 190 ml of water were introduced into a 2 l glass reactor with anchor agitator and 4 addition vessels, heated under inert gas to an internal temperature of 65° C. and partially neutralized with 20 g of NaOH (50% strength). A mixture of 125.2 g of vinyl acetate and 175.3 g of acrylic acid was metered into this solution over the course of 5 h. Starting at the same time, a solution of 20.4 g of sodium peroxodisulfate in 184 ml of water and 30.6 g of sodium bisulfite in 263 g of water was metered in over the course of 6 h. The internal temperature of the reaction mixture was kept at 65° C. during this. After the additions were complete, the mixture was heated at 65° C. for a further 2 h. The solution was cooled to room temperature and, while cooling, adjusted to pH 7 with sodium hydroxide solution.

The polymer had a K value of 50. The aqueous solution contained 2.7% sodium acetate.

EXAMPLE 9

16.0 g of a 20% strength solution of an adduct of 25 mol of ethylene oxide and 1 mol of isooctylphenol and 12.3 g of a 35% strength solution of a sulfate of an adduct of 25 mol of ethylene oxide and 1 mol of isooctylphenol in 350 ml of water were introduced into a 2 l glass reactor with anchor agitator and 4 addition vessels and heated under inert gas to an internal temperature of 65° C. A mixture of 160 g of vinyl acetate and 240 g of acrylic acid were metered into this solution over the course of 5 h. Starting at the same time, a solution of 40 g of sodium peroxodisulfate in 160 ml of water and 80 g of sodium bisulfite in 260 g of water was metered in over the course of 6 h. The internal temperature of the reaction mixture was kept at 65° C. during this. After the additions were complete, the mixture was heated at 65° C. for a further 2 h. Subsequently steam was passed into the solution at 100° C., and water/acetic acid mixture was distilled out, for 5 h. The result after neutralization with NaOH was a yellowish solution of the polymer. The copolymer had a K value of 11.7. The aqueous copolymer solution contained 2.1% sodium acetate.

EXAMPLE 10

32 g of a 20% strength solution of an adduct of 25 mol of ethylene oxide and 1 mol of isooctylphenol and 18.3 g of a 35% strength solution of a sulfate of an adduct of 25 mol of ethylene oxide and 1 mol of isooctylphenol in 342 ml of water were introduced into a 2 l glass reactor with anchor agitator and 4 addition vessels and heated under inert gas to an internal temperature of 65° C. A mixture of 160 g of vinyl acetate and 240 g of acrylic acid was metered into this solution over the course of 5 h. Starting at the same time, a solution of 40 g of sodium peroxodisulfate in 160 ml of water and 80 g of sodium bisulfite in 260 g of water was metered in over the course of 6 h. The internal temperature of the reaction mixture was kept at 65° C. during this. After the additions were complete, the mixture was heated at 65° C. for a further 2 h. Subsequently, steam was passed into the solution at 100° C., and water/acetic acid mixture was distilled out, for 2 h. The result after neutralization with NaOH was a yellowish solution of the copolymer. The copolymer had a K value of 11.7. The aqueous copolymer solution contained 1.4% sodium acetate.

COMPARATIVE EXAMPLE 1

Example 1 was repeated without addition of the surface-active agent. The solution contained 12.3% sodium acetate.

Examples of Use

The encrustation-inhibiting properties of the copolymers were determined in a washing test in which test fabrics of, in each case, cotton were washed in 15 wash cycles. After this number of washes, the ash content of the fabric was determined by ashing the test fabric in each case. The ash content after the repeated washes is inversely related to the efficacy of the copolymer as encrustation inhibitor. The ash contents obtained in two series of tests are shown in Tables 3 and 4. The copolymers show marked activity, as evident from comparison with the test without polymer. As a further comparison, in each series a test was carried out with a commercial encrustation inhibitor as standard prior art polymer. Most of the copolymers according to the invention show distinct improvements compared with the standard polymer.

TABLE 1

| Washing conditions | |
|---|---|
| Washing appliance | Launderometer |
| Detergent liquor | 250 g |
| Detergent dosage | 4.5 g/l |
| Washing time | 30 min |
| Washing temperature | 60° C. |
| Wash liquor ratio | 1:12.5 |
| Number of wash cycles | 15 |
| Test fabric | 20 g of cotton fabric |
| Water hardness | 4.0 mmol |
| Ca:Mg ratio (molar) | 4:1 |

TABLE 2

| Detergent composition | |
|---|---|
|  | % by wt. |
| Alkylbenzenesulfonate | 8.00 |
| $C_{13}/C_{15}$—Oxo alcohol ethoxylated with 7 ethylene oxide | 7.00 |
| Fatty acid Na salt | 2.00 |
| Carboxymethylcellulose | 1.00 |
| Zeolite A | 36.00 |
| Sodium carbonate | 12.00 |
| Sodium perborate * tetrahydrate | 22.00 |
| TAED [1] | 2.00 |
| optical brightener | 0.20 |
| Enzymes | 0.50 |
| Copolymer (100%) | 5.00 |
| Sodium sulfate | ad 100 |

[1] TAED = Tetraacetylethylenediamine

The results of the washing tests are shown in Tables 3 and 4:

TABLE 3

| Wash series 1 | | | |
|---|---|---|---|
| Example No. | Comparative Example No. | Copolymer of Example | Ash [%] |
| — | 2 | none | 3.62 |
| — | 3 | AA/MA[a] | 2.67 |
| 11 | — | 1 | 2.56 |
| 12 | — | 2 | 3.09 |
| 13 | — | 3 | 2.16 |
| 14 | — | 4 | 2.38 |

[a] Copolymer of acrylic acid and maleic acid in the ratio 70:30 by weight with a K value (measured on the Na salt in 1% strength aqueous solution) of 60

TABLE 4

| Wash series 2 | | | |
|---|---|---|---|
| Example No. | Comparative Example No. | Copolymer of Example | Ash [%] |
| — | 4 | none | 3.23 |
| — | 5 | AA/MA[a] | 2.31 |
| 15 | — | 5 | 1.99 |
| 16 | — | 6 | 2.19 |
| 17 | — | 7 | 1.82 |
| 18 | — | 8 | 2.03 |

[a] cf. key to Table 3

Test of the biodegradability of the copolymers

The copolymers have a markedly better biodegradability than prior art polycarboxylates based on acrylic acid or acrylic acid/maleic acid.

The biodegradability was tested by incubating each of the copolymers indicated in Table 5 as the sole carbon source (20 mg/l dissolved organic carbon=DOC) with activated sludge (150 mg/l dry matter) in a treatment system, and determining the $CO_2$ evolved ($CO_2$ jar test—modification of the OECD 301 B Sturm test). The biodegradation percentages in Table 5 are based on the ratio of carbon in the $CO_2$ formed to the total carbon in the added test substance (TOC=total organic carbon).

TABLE 5

| Copolymer of Example | % Degradation after 42 days |
| --- | --- |
| 1 | 41% |
| 2 | 49% |
| 6 | 48% |
| 7 | 59% |
| AA/MA[a]) (Comparison) | 7% |

[a])cf. key to Table 3

We claim:

1. A process for preparing a copolymer of at least one vinyl ester and at least one monoethylenically unsaturated carboxylic acid by free-radical copolymerization in aqueous medium in the presence of an initiator, which comprises copolymerizing
    (a) 20 to 80% mol of at least one vinyl ester of an aliphatic monocarboxylic acid having at least 2 carbon atoms;
    (b) 80–20 mol % of a monoethylenically unsaturated carboxylic acid;
    (c) 0–30 mol % of a copolymerizable monoethylenically unsaturated monomer; and
    (d) 0–10 mol % of a monomer which contain at least two non-conjugated ethylenic double bonds in the molecule,
    in the presence of a sulfur compound with a reducing action, and of 0.05–30% by weight, based on the monomers, of at least one surface-active agent;
wherein said initiator is selected from the group consisting of alkali metal peroxodisulfate and ammonium peroxodisulfate; and wherein the molar ratio of peroxodisulfate to the sulfur compound with a reducing action is from 1:1.5 to 1:20.

2. A process as claimed in claim 1, wherein the degree of neutralization of the monomers containing acidic groups does not exceed 30%.

3. A process as claimed in claim 1, wherein mixtures of
    (a) 25–75 mol % of vinyl acetate and/or vinyl propionate and
    (b) 75–25 mol % of acrylic acid and/or methacrylic acid monomers are copolymerized.

4. A process as claimed in claim 1, wherein mixtures of
    (a) 25–75 mol % of vinyl acetate and/or vinyl propionate,
    (b1) 20–60 mol % of acrylic acid and/or methacrylic acid, and
    (b2) 10–55 mol % of maleic acid monomers are copolymerized.

5. A process as claimed in claim 1, wherein said at least one surface-active agent is selected from the group consisting of alkoxylated alcohols, alkoxylated phenols, alkoxylated amines, alkoxylated carboxylic acids, alkyl sulfates, alkylsulfonates, alkylbenzenesulfonates and block copolymers of ethylene oxide and propylene oxide.

6. A process as claimed in claim 1, wherein the surface-active agents are used in amounts of from 0.5 to 15% by weight of the weight of the monomers.

7. The process of claim 1, wherein said free-radical copolymerization is carried out in the presence of a regulator.

* * * * *